Patented Mar. 23, 1937

2,074,782

UNITED STATES PATENT OFFICE 2,074,782

RESINOUS COMPOSITIONS AND PROCESS OF MAKING SAME

Donald Edwards Edgar, Philadelphia, Pa., assignor to E. I. du Pont de Nemours & Company, Wilmington, Del., a corporation of Delaware No Drawing. Application October 9, 1935, Serial No. 44,305

9 Claims. (Cl. 134—26)

This invention relates to resinous compositions and more particularly to a combination of oil or oil acid modified polyhydric alcohol-polybasic acid resin and urea-formaldehyde condensation product.

It is well known that resinous products obtained from the reaction of urea and formaldehyde possess certain disadvantages in their use as coating compositions as such, among which may be mentioned the lack of flexibility of the film produced. The resins are also sparingly soluble in the usual organic solvents which introduces difficulties in their application. These resinous materials, however, possess certain desirable properties such as being relatively colorless and hardening rapidly under the influence of heat.

Attempts have been made to prepare coating compositions from resinous materials obtained from the reaction of urea and aldehydes but not with a great deal of commercial success. The fatty oil and fatty oil acid modified polyhydric alcohol-polybasic acid resins, on the other hand, are used as protective and decorative coating compositions quite satisfactorily but require longer heat treatments than is often practical to produce hard films. A combination of the resinous product obtained from urea and formaldehyde and fatty oil modified polyhydric alcohol-polybasic acid resin has been proposed but this practice has been limited more specifically to the use of so-called non-drying oil modified polyhydric alcohol-polybasic acid resin because of the difficulties encountered when attempting to produce combinations of urea formaldehyde resinous products and other fatty oil or fatty oil acid modified polyhydric alcohol-polybasic acid resins than the non-drying oil modified resin. Many of the fatty oil and fatty oil acid modified polyhydric alcohol-polybasic acid resins are not satisfactorily compatible with the reaction product of urea and formaldehyde and result in a non-homogeneous composition.

This invention has as an object the manufacture of new and useful resinous compositions comprising a combination of the reaction product of urea and formaldehyde with fatty oil and fatty oil acid modified polyhydric alcohol-polybasic acid resins. A further object is the provision of a process for preparing these resinous compositions which is successfully and advantageously used with the drying and semi-drying oils as well as with the non-drying oils. A still further object is a process for combining resins of the kind described above which includes a special treatment of the polyhydric alcohol-polybasic acid resin by means of which a highly compatible and homogeneous resinous combination is produced. Other objects will appear hereinafter.

These objects are accomplished in the present invention by treating the fatty oil or fatty oil acid modified polyhydric alcohol-polybasic acid resin with an organic peroxide as benzoyl peroxide and then combining the treated resin with the reaction product of urea and formaldehyde.

The following examples are illustrative of methods which may be used for carrying out my invention:

Example I 40.7 parts of linseed oil, 8 parts of 95% glycerol and 0.04 part of sodium hydroxide are heated with agitation in a suitable container to a temperature of 240° C. The material is held at this temperature until a sample is clear and homogeneous and soluble in two parts of methyl alcohol. 41.1 parts of phthalic anhydride and 10.2 parts of 95% glycerol are then added and the heating continued until the product possesses an acid number of 25±5. To 100 parts of the product obtained as above is added 2 parts of benzoyl peroxide, the temperature being approximately 50° C. The temperature of the material is then raised to 95 or 100° C. and during constant agitation maintained at this temperature until the benzoyl peroxide has passed into solution, that is, until the peroxide has disappeared and is no longer dispersed in the mass. To this is then added 200 parts of monoethyl ether of ethylene glycol and 100 parts of the reaction products of urea and formaldehyde. The temperature is again raised to 95–100° C. and the material thoroughly agitated until substantially all of the reaction product of urea and formaldehyde has disappeared. Any undissolved material remaining may be removed by filtration, centrifuging or any other suitable means. The product thus formed produces a hard and tough film after baking for approximately 20 minutes at 100° C.

Example II 45 parts of cottonseed oil and 9 parts of 95% glycerol are heated to 220–240° C. with 0.05 part of litharge. The material is thoroughly agitated and the temperature maintained within the above range until a sample is clear and homogeneous and soluble in 2 parts of methyl alcohol. 42.5 parts of phthalic anhydride and 9.9 parts of 95% glycerol are then added and the heating continued at 220–225° C. until the product possesses an acid number of 45±5. The material is then allowed to cool at a temperature of about 50° C. and 2 parts of benzoyl peroxide added. The temperature is raised to 80–100° C. and the material with proper agitation held at this temperature until all of the benzoyl peroxide has been dissolved. 200 parts of monoethyl ether of ethylene glycol and 100 parts of the reaction product of urea and formaldehyde are then added and the mixture heated at 95–105° C. until substantially all of the reaction product of urea and formaldehyde has passed into solution. Any insoluble material which remains may be removed by any of the usual well known procedures. The resulting product is clear and light colored and on short baking at a relatively low temperature forms a clear, hard and tough film.

*Example III*

50 parts of soya bean oil, 10 parts of 95% glycerol and 0.05 part of sodium hydroxide are heated together in a suitable container to a temperature of 200–240° C. and maintained at this temperature until a sample removed therefrom is clear and homogeneous and soluble in two parts of methyl alcohol. 38.7 parts of phthalic anhydride and 7.3 parts of 95% glycerol are added and the heating continued at a temperature of 220–225° C. until an acid number below 10 is obtained. To 100 parts of the product thus obtained are added 50 parts of monoethyl ether of ethylene glycol and at a temperature below the boiling point of the latter is added three parts of benzoyl peroxide. The mass is then heated at a temperature of 90–100° C. until the benzoyl peroxide has passed into solution. 100 parts of the reaction product of urea and formaldehyde are then added and further 150 parts of ethyl ether of ethylene glycol and the mixture heated at a temperature of from 95 to 105° C. until substantially all of the reaction product of urea and formaldehyde has passed into solution. The resulting product is then filtered and yields a clear light colored product which forms a hard and tough film after being baked for a short period of time at a relatively low temperature.

*Example IV*

50 parts of China-wood oil, 10 parts of 95% glycerol and 0.05 part of sodium hydroxide are heated to a temperature of 220–240° C. with proper agitation and maintained at this temperature until a sample is clear and homogeneous and soluble in two parts of methyl alcohol. 38.7 parts of phthalic anhydride and 7.3 parts of 95% glycerol are then added and heating continued at a temperature of 220–225° C. until the product possesses an acid number of below 10. To 100 parts of the product thus obtained and 50 parts of monoethyl ether of ethylene glycol are added 3 parts of benzoyl peroxide and the mixture heated at a temperature of 90–100° C. until the benzoyl peroxide has passed into solution. 100 parts of the reaction product of urea and formaldehyde and 150 parts of ethyl ether of ethylene glycol are then added and the mass heated at a temperature of 95–105° C. until substantially all of the solid material has passed into solution. Any undissolved material which remains may be removed by filtration, centrifuging or any other suitable means. The resulting product is a clear light colored material which forms a hard, tough film after baking for a short period of time at a relatively low temperature.

In place of the reaction product of urea and an aldehyde the reaction of thiourea and an aldehyde may be combined with the reaction catalyst treated modified polyhydric alcohol-polybasic acid resins. The reaction product of urea and formaldehyde for example may include methylol urea, dimethylol urea, methylene urea, a mixture of these or polymerization products thereof. The term reaction product of urea and formaldehyde for the present purpose, therefore, embraces any or all products which may be prepared by well known procedures.

In combining the peroxide with the polyhydric alcohol-polybasic acid resin I prefer to use the temperature range given in the examples, namely, 95 to 105° C. although somewhat higher temperatures up to 125° C. may be used. About the same heat schedule is applicable in the step of combining the peroxide treated resin with the urea resin.

In the examples benzoyl peroxide has been used as the treating agent or reaction catalyst and is preferred because of its ready availability. Other organic peroxides such as acetyl peroxide, allyl peroxide, dibutyl peroxide, dioleyl peroxide, dinitrobenzoyl peroxide, and similar materials may, however, be used. The amount used may vary over a range of from 1% to 5%, inclusive, less than 1% not being practical and greater amounts than 5% being unnecessary.

Any of the fatty oil or fatty oil acid modified polyhydric alcohol-polybasic acid resins may be used in the practice of the invention. Such fatty oils or fatty oil acids may include those comprising the general classes of non-drying, semi-drying or drying oils. The polyhydric alcohol-polybasic acid resins mentioned above, whether made with oil as an ingredient as described above or made in the known method by heating to resinification a mixture of polyhydric alcohol, polybasic acid and the acids derived by hydrolysis from fatty oils are polyhydric alcohol esters containing the acid radicals of fatty oil acids in addition to the acid radicals of polybasic acid. These resins containing fatty oil or oil acid in chemical combination are known to the trade as oil modified polyhydric alcohol-polybasic acid resins.

As solvents in place of the ethyl ether of ethylene glycol used in the examples such alcohols as propyl, isopropyl, butyl, and isobutyl alcohols; secondary alcohols, such as secondary butyl, amyl and hexyl alcohol; the aromatic alcohols such as benzyl, cyclohexyl, etc. alcohols may be used. The choice of the solvent will depend to some extent upon the solvents content desired in the finished resinous composition and also upon the availability of the material.

The compatibility of the polyhydric alcohol-polybasic acid resin and the urea-formaldehyde reaction product is not brought about in the present invention merely by the solution or dispersion of the peroxide in the mentioned resin but apparently by some change brought about in the resin.

The resinous composition described above may be used as unpigmented coatings or there may be incorporated therewith pigments to produce colored coating compositions or enamels. Fillers may also be used with the pigments if desired. The choice of pigments and fillers will be readily understood by those skilled in the art.

The resin solutions may further be used with cellulose derivative combinations, for example, nitrocellulose dispersions to produce lacquers, such lacquers may contain, in addition, other lacquer ingredients as softeners, plasticizers, other natural or synthetic resins, pigments, fillers, dyes, etc.

The enamels prepared from the resinous combinations may be applied to suitable surfaces by well known means as, for example, spraying, brushing, dipping, etc. The coatings may be allowed to air dry if desired or they may be preferably dried by subjecting for a short period of air drying and then baking at elevated temperatures of, for example, 220° F. for a period of 30 minutes after which treatment a hard, tough and durable film is formed. The coatings may be baked at a lower temperature of, for example, 140–150° F. with a corresponding increase of time or at a higher temperature, as 300° F., with a corresponding decrease in time.

The products of the invention are useful in preparing coating compositions, either pigmented or unpigmented, for protective and decorative purposes on various types of surfaces such as wood, metal, glass, etc. The products may be further used in combination with cellulose derivatives as the esters or ethers for producing various types of lacquers. Other uses of the products because of the very desirable properties possessed by them will be readily suggested to those skilled in the art.

The present invention, as compared to other methods proposed to accomplish the same result, provides an inexpensive, simplified, and easily operated process for producing homogeneous blends of urea-aldehyde resins with oil modified polyhydric alcohol-polybasic acid resins. The resinous compositions described herein produce coating compositions yielding hard, tough and water resistant films. These resinous compositions are further advantageous in that the enamel compositions made therefrom can be converted into hard, tough and durable protective coatings by baking at relatively low temperatures.

As many apparently widely different embodiments of this invention may be made without departing from the spirit and scope thereof, it is to be understood that I do not limit myself to the specific embodiments thereof except as defined in the appended claims.

I claim:

1. A process for making a compatible and homogeneous resinous mixture which comprises heating fatty oil modified polyhydric alcohol-polybasic acid resin with an organic peroxide and combining with the peroxide treated resin a urea-aldehyde condensation product.

2. A process which comprises dissolving with heat treatment a small amount of organic peroxide in fatty oil modified polyhydric alcohol-polybasic acid resin and heating a solution of the peroxide treated resin with urea-aldehyde condensation product until a homogeneous composition is obtained.

3. The process set forth in claim 1 in which the aldehyde is formaldehyde.

4. The process set forth in claim 1 in which the resin is an oil modified glyceryl phthalate resin.

5. The process set forth in claim 1 in which the aldehyde is formaldehyde and the resin is an oil modified glyceryl phthalate resin.

6. A resinous composition comprising a homogeneous combination of urea-aldehyde condensation product and the product obtained by dissolving with heat treatment an organic peroxide in a fatty oil modified polyhydric alcohol-polybasic acid resin.

7. The product set forth in claim 6 in which the aldehyde is formaldehyde.

8. The product set forth in claim 6 in which the resin is an oil modified glyceryl phthalate resin.

9. The product set forth in claim 6 in which the aldehyde is formaldehyde and the resin is an oil modified glyceryl phthalate resin.

DONALD EDWARDS EDGAR.